United States Patent
Lundy et al.

(10) Patent No.: US 6,884,174 B2
(45) Date of Patent: Apr. 26, 2005

(54) COMMUNICATION PROTOCOL FOR GAMING SYSTEM CONFIGURATION

(75) Inventors: Christopher Lundy, Reno, NV (US); Garret Olson, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 10/183,108

(22) Filed: Jun. 26, 2002

(65) Prior Publication Data

US 2004/0002383 A1 Jan. 1, 2004

(51) Int. Cl.[7] .................................................. A63F 9/24
(52) U.S. Cl. ........................................................ 463/42
(58) Field of Search ............................... 463/16–22, 25, 463/24, 40–42; 273/138.1, 138.2, 139, 143 R

(56) References Cited

U.S. PATENT DOCUMENTS 5,655,961 A * 8/1997 Acres et al. ................. 463/42
6,254,483 B1 * 7/2001 Acres ........................... 463/26

OTHER PUBLICATIONS

"VLC Video Lottery Terminal Communication Protocol for Atlantic Lottery Corporation's Video Lottery Control System Technical Specifications Revision D", VLC, Inc. 1991, pp. 1–70.*

"VLC Technical Specification Gaming Machine Communication Protocol for New Mexico Gaming Machine Monitoring System Protocol Version F3.0.02–NM", © 1996–1999 Powerhouse Technologies, Inc., pp. 1–68.*

* cited by examiner

Primary Examiner—Mark Sager
(74) Attorney, Agent, or Firm—Marshall, Gerstein & Borun LLP

(57) ABSTRACT

A method and apparatus for communicating gaming machine settings is disclosed. In one embodiment a universal configuration communication protocol is provided for retrieving or modifying, over a network, current gaming machine setting of a remotely located gaming machine. A translation table may be implemented with the communication protocol to achieve variable translation between different gaming machine platforms. In one embodiment the gaming machine status is requested prior to activating the communication protocol to prevent interruption of game play. In one embodiment activation of the communication protocol may result in the gaming machine momentarily entering an inactive status.

24 Claims, 13 Drawing Sheets

| Comm. Protocol Variable | G.M. Type 1 Variable Set | G.M. Type 2 Variable Set | G.M. Type 3 Variable Set |
|---|---|---|---|
| Pay Limit | PyLim | A | R |
| Hop Limit | HLim | B | S |
| Pay Table | PyTab | C | T |
| Mchn Denom | MD | D | V |
| Jkpt Lim | JL | E | X |
| GM Theme | GT | F | Y |
| Op. Hrs | OH | G | Z |

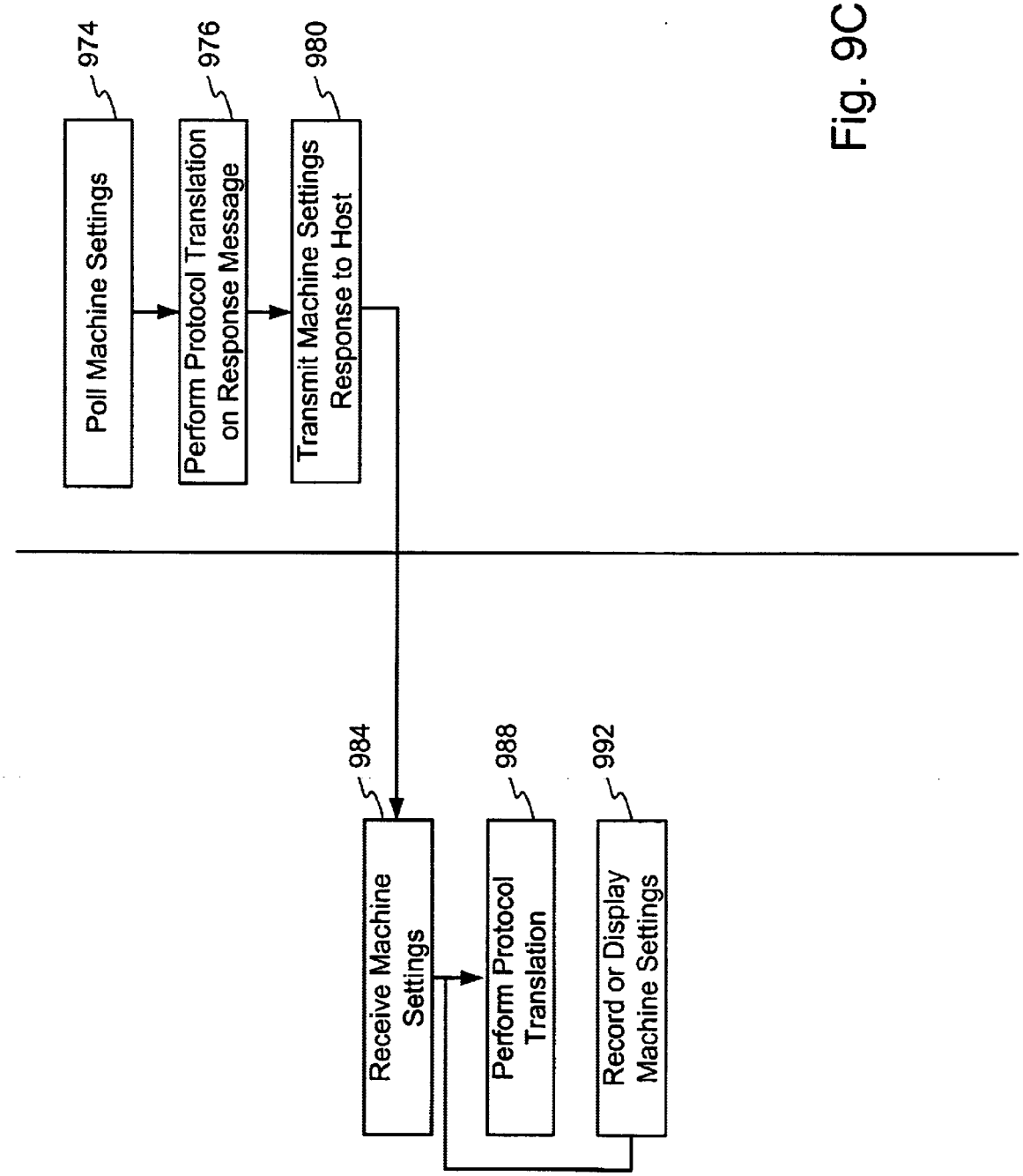

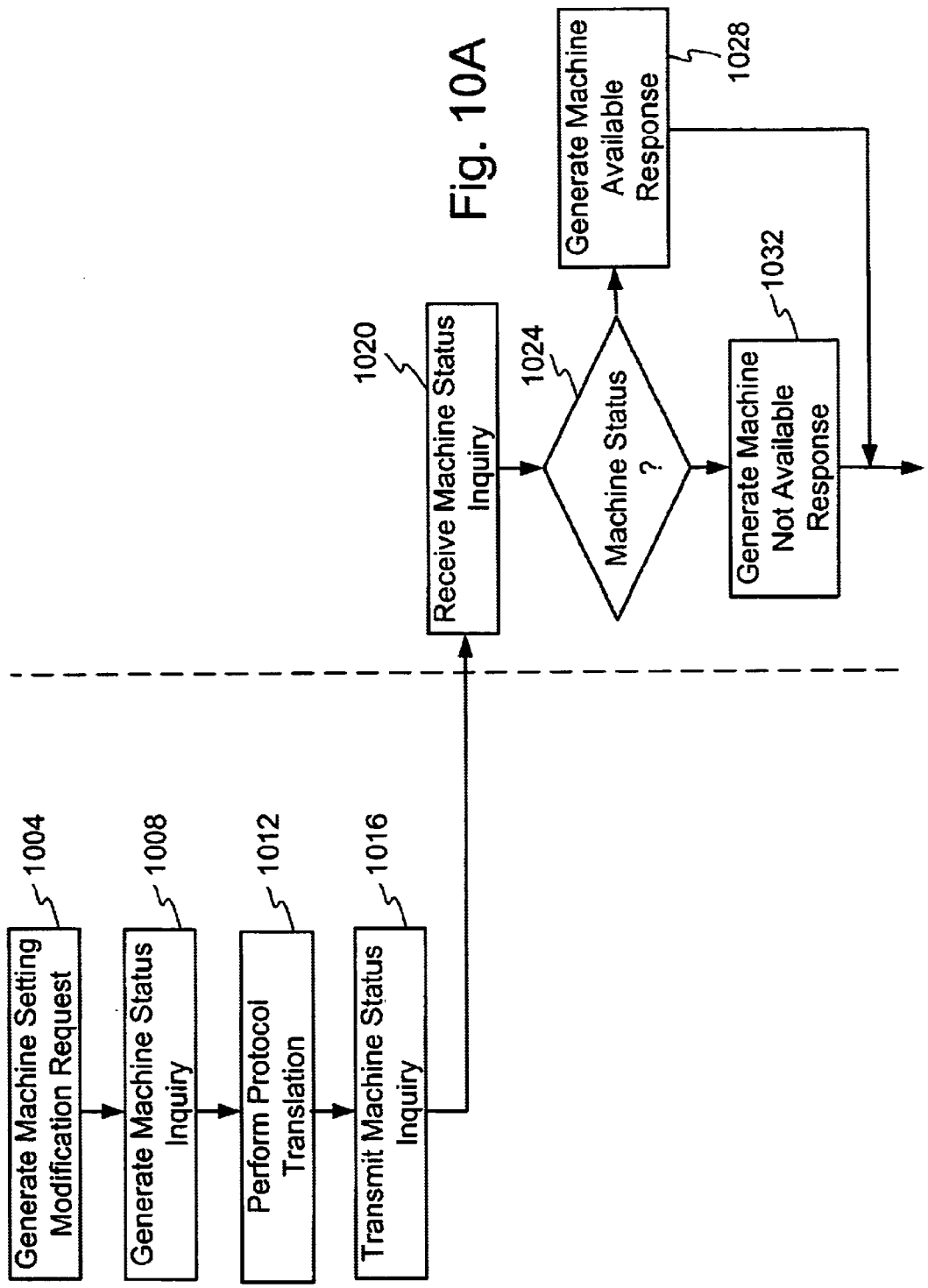

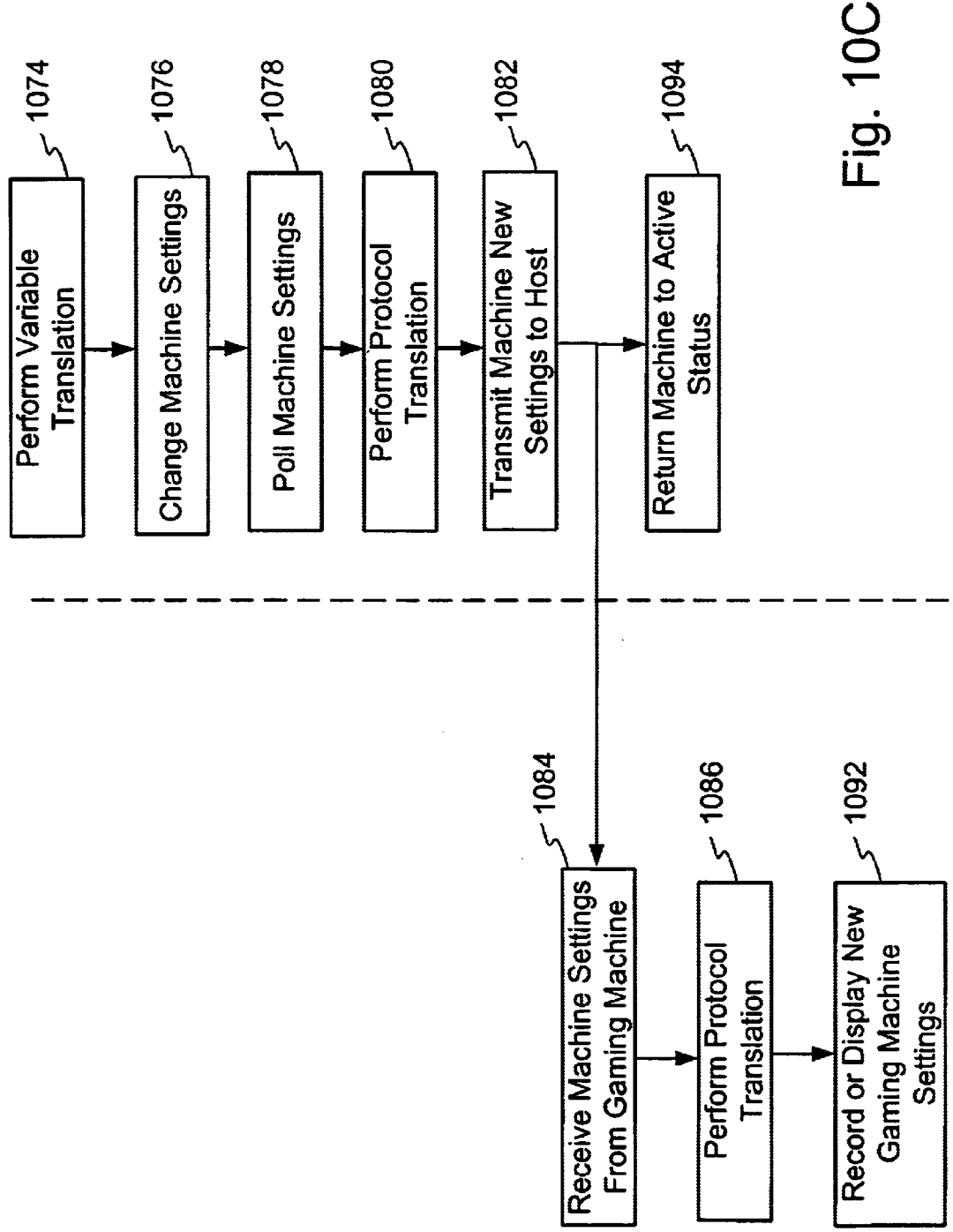

COMMUNICATION PROTOCOL FOR GAMING SYSTEM CONFIGURATION

FIELD OF THE INVENTION

The present invention relates to gaming machine configuration and in particular to a communication protocol for gaming machine analysis and gaming machine configuration.

BACKGROUND OF THE INVENTION

One aspect of gaming machine operation is proper configuration of the gaming machine. Gaming machine configuration may include the assignment of various gaming machine settings to control aspects of game play. The machine settings may include but are not limited to payout limits, accrued winning amounts before automatic payout, hopper limits, pay tables and pay rates, machine denomination, single winning event jackpot limits and game theme settings. In some jurisdictions certain machine settings are closely regulated and the jurisdiction may require that the machine settings be adjusted depending on various factors such as the location of the machine, the time of day, or the day of the week.

In the prior art, the appropriate or desired machine settings were logged in hardcopy form in a binder or folio. Using a hardcopy report of the appropriate machine settings a technician would physically locate a machine and manually enter, i.e., set up, the machine settings.

To enter the data, gaming machines of the prior art often included a touch-screen or other similar user interface for the technician to gain access to the machine and configure the machine settings. Access to the gaming machine, which is a high security issue, may be granted through use of complex technician-entered pass codes or expensive and fragile security chips or hardware. The machine-accessible configuration undesirably creates a necessity for security measures that are complex and expensive to implement.

As can be understood the process of manually configuring a machine's settings via a touch screen interface are a time consuming and tedious operation. The technician must continually refer to the hardcopy binder that contains the machine settings and enter each setting via a touch screen. If configuration occurs via a touch screen, then a further drawback is that the gaming machine must include a touch screen enabled software interface that allows the technician to control machine settings. In addition, during the time consuming machine setup operation the game is not in play and hence potential gaming revenues are lost. In other embodiments a machine's buttons may be used. This results in configuration becoming a very time consuming operation since there a limited number of buttons on a machine.

As a result of the above-described drawbacks in gaming machine set-up or configuration, there is a need for an efficient way to establish gaming machine settings. The method and apparatus described herein provides an efficient way to determine current gaming machine settings. Also described herein is a method and apparatus to achieve compatibility between different various gaming platforms, operating systems and network protocols.

SUMMARY OF THE INVENTION

The invention overcomes the drawbacks of the prior art by providing a communication protocol that provides a standardized communication format and system for determining a gaming machine's settings and modifying a gaming machine's settings. In one embodiment the invention comprises a method for determining settings on a gaming machine via a computerized network comprising generating a machine settings request at a host and converting the settings request using the communication protocol to create a standardized settings request. The standardized settings request may be compatible over two or more computer networks. Thereafter the method transmits the standardized settings request over a computer network to a gaming machine. The gaming machine receives the standardized settings request and performs a variable translation at the gaming machine on the standardized settings request to obtain translated variables. The translated variable are variables that may be understood by the gaming machine. Next, the method retrieves the machine settings from the gaming machine based on the translated variables and transmits a response containing the machine settings to the host machine. The host machine receives the response from the gaming machine and may optionally display or record the response.

In one embodiment this method may, upon receipt of the standardized settings request at the gaming machine, designate the gaming machine in inactive status. In another embodiment the method further comprises verifying that the gaming machine is not in play prior to retrieving the machine settings at a gaming machine.

In another embodiment a method for determining the settings of a gaming machine via a computerized network is provided. This method comprises receiving a settings request at a gaming machine and converting the settings request to a gaming machine specific format based on a communication protocol and a translation table. Thereafter, the method polls the gaming machine to obtain the requested gaming machine settings and transmits the gaming machine settings over the computerized network. In one embodiment the method further includes transmitting a machine active message to a host machine if the gaming machine is in play upon receipt of the settings request and if gaming machine is in play then not polling or transmitting the gaming machine settings.

Another method comprises a method for modifying gaming machine settings from a host computer. This method comprises generating a machine status inquiry at the host computer and sending the machine status inquiry to a gaming machine over a computer network. Thereafter the host machines receives an inquiry response from the gaming machine, the inquiry response indicating if the gaming machine is available. If it is available, the host machine sends a gaming machine setting modification request to the gaming machine if the inquiry response indicates that the gaming machine is available. The gaming machine setting modification request is configured to modify one or more settings of the gaming machine. Next, the method receives, at the host computer, a gaming machine setting modification response from the gaming machine regarding whether gaming machines settings were modified.

In one embodiment the machine status inquiry comprises an inquiry sent to a gaming machine to determine if the gaming machine is being played by a player. In one embodiment the method may further include providing a message on the host computer that the gaming machine is not available if the inquiry response indicates that the gaming machine is not available. In one embodiment generating comprises obtaining input from a user of the host computer regarding which of one or more gaming machines to send a status inquiry to and formatting the status inquiry into a format for transmission over a computerized network.

In yet another embodiment the method described herein is a method for modifying settings of a gaming machine which comprises providing data to a computerized device regarding which settings to modify and formatting the data into a setting modification request for use by software on the gaming machine. Then providing the setting modification request to a network interface of the computerized device for transmission to a gaming machine. The gaming machine receives and processes the setting modification request at the gaming machine and seizes control of the gaming machine to prevent play during the modification of the settings. The gaming machine or communication protocol software modifies one or more settings of the gaming machine based on the setting modification request.

In one embodiment the computerized device comprises a computer. The transmission to the gaming machine may occur over a computerized network. The data may specify which gaming machine is to have its settings modified and the setting modification request may include at least one setting and the at least one setting is represented by a first variable and the method may further include translating the first variable to a second variable, wherein the second variable is utilized by the gaming machine. It is further contemplated that in other embodiments more than one variable sent from the host may be translated into a single variable at the gaming machine or a single variable from the host may be translated into more than one variable at the gaming machine. For example, a pay out limit variable sent to from a host may be translated into a hopper limit variable, credit limit variable, and a bet limit variable at the gaming machine. In one embodiment the method includes sending a setting modification confirmation from the gaming machine to the computerized device to provide confirmation that gaming machine settings were modified.

A system is also described herein for changing one or more settings of a gaming machine from a remote location. Such a system comprises a host system and a gaming machine. The host system includes a user interface, a first network interface configured to communicate over a computerized network, a processor configured to execute computer program code logic, and a processor readable medium configured to store software code or data. The software code or data may comprise computer program code logic configured to generate a gaming machine settings modification request and computer program code logic configured to receive the gaming machine settings modification request and transmit the gaming machine settings modification request to a gaming machine via the first network interface.

The gaming machine may comprise a second network interface configured to communicate over a computerized network, a processor configured to execute computer program code logic, a processor readable medium configured to store software code or data. The software code and data may comprise computer program code logic configured to receive the gaming machine settings modification request via the second network interface and computer program code logic configured to process the gaming machine settings modification request to thereby modify one or more settings of the gaming machine. In one embodiment the gaming machine settings modification request is in a format compatible with two or more gaming machine network protocols.

In one configuration one of the one or more settings of the gaming machine comprise a setting that controls the pay out rate for the gaming machine. The gaming machine described above may further include a processor readable medium storing computer program code logic configured to translate a variable representing a setting to be modified by the gaming machine settings modification request to a format compatible with the gaming machine. The gaming machine may also further include a processor readable medium storing computer program code logic configured to prevent gaming machine play during modification of one or more settings of the gaming machine.

In yet another embodiment the communication protocol configured to facilitate the modification of one or more settings of a gaming machine from a remote location is provided. The communication protocol may be configured to receive data from a machine settings control module located on a host system such that the data identifies at least one gaming machine to which a settings request is to be sent. The communication protocol also processes the data into a settings request so that the settings request is compatible with gaming machine platforms equipped with the communication protocol and provides the settings request to a communication device associated with the host system for transmission to a gaming machine at a remote location.

In one embodiment the communication protocol is further configured to receive the settings request from a communication device associated with the gaming machine, process the settings request to determine one or more actions requested in the settings request, and execute the one or more actions. The communication protocol may be further configured to prevent play of the gaming machine when the communication protocol processes the settings request and executes the one or more actions. In addition, the communication protocol may be further configured to translate a variable associated with the communication protocol to a variable associated with the gaming machine and the settings request may comprise a request to determine current settings of a gaming machine.

In some embodiments the gaming machine comprises a gaming machine on a casino floor. While in other embodiments the communication device comprises a communication device configured to transmit the settings request over a computer network, the computer network consisting of a local area network, a wide area network, a gaming machine network, the Internet, a public switched telephone network, or a wireless network.

DETAILED DESCRIPTION OF THE INVENTION

The method and apparatus described herein is a communication protocol for machine setting inquiry and modification, a system for communication protocol operation and a method for machine setting inquiry and modification. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
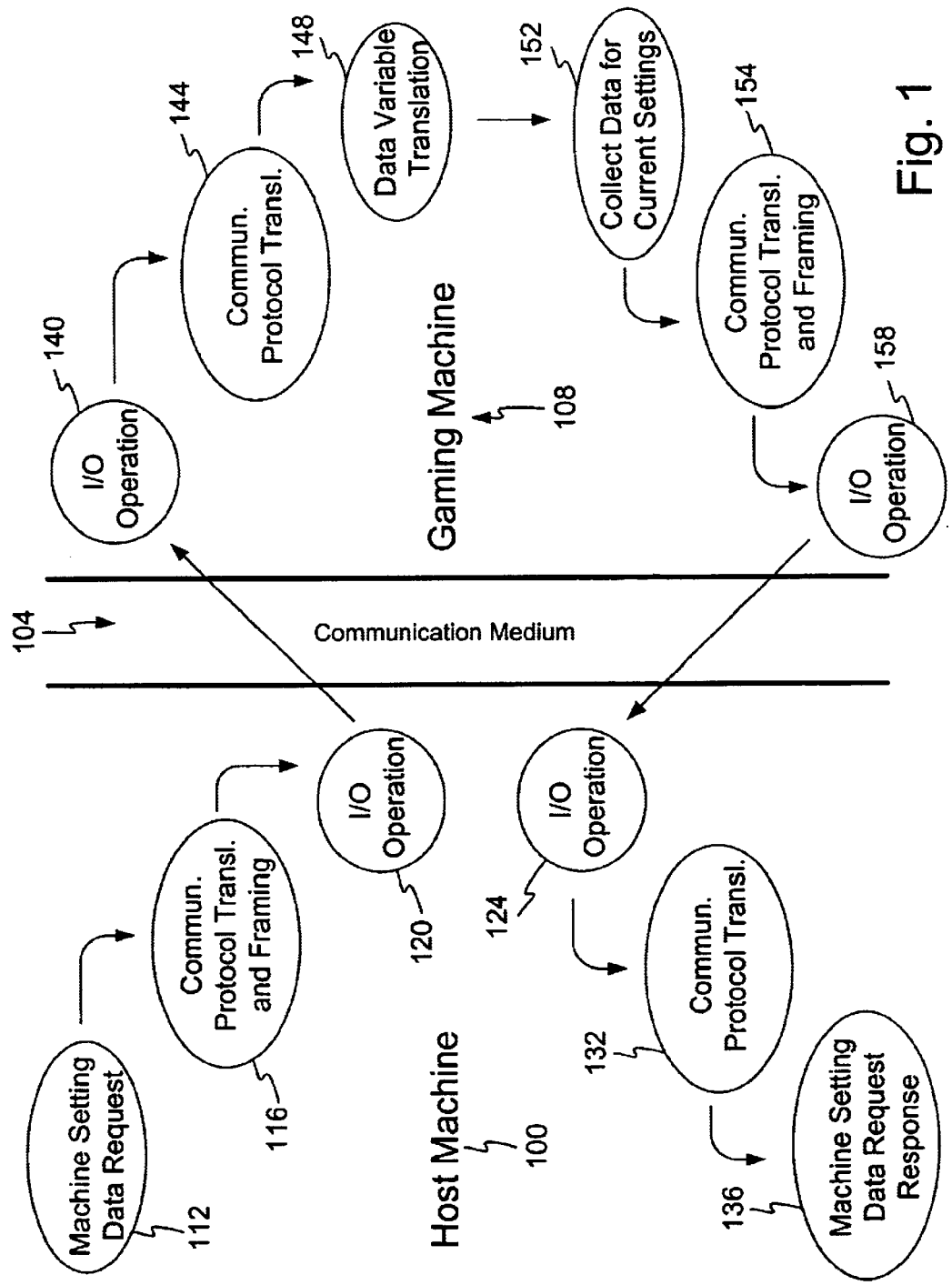
FIG. 1 illustrates a generalized process diagram of an example process for gaming machine setting inquiry.

FIG. 1 illustrates a generalized process diagram of an example process of gaming machine settings inquiry as described herein. A host machine 100 is designated on the left-hand side of FIG. 1, while a gaming machine 108 is designated on the right-hand side of FIG. 1. Between the gaming machine 108 and host machine 100, a communication medium 104 is shown. It is contemplated that the host machine 100 communicates with one or more gaming machine 108 via a computer network or other communication system using the communication medium 104 to relay data or signals. In one embodiment the host machine 100 comprises a server computer, the communication medium 104 comprises Ethernet, twisted pair, wireless, or any other suitable channel, and the gaming machine 108 comprise any type of device configured to provide a gaming experience or gaming event to a player.

To overcome the drawbacks of the prior art, the method and apparatus described herein provides a communication protocol to facilitate configuration of a gaming machine over a gaming network or a computer network. The communication protocol may also be utilized to poll a gaming machine to determine its current settings. The communication protocol described herein is intended to be universally compatible across various hosts and gaming machine platforms. As a result it desirably includes functionality to interface with various host systems and gaming machine platforms and may further include protocol translation tables and data variable tables to gain compatibility with numerous various systems.

In reference to FIG. 1, at an operation 112 a machine setting data request is generated in an effort to obtain the status or settings of a remote gaming machine. Machine settings may include, but are not limited to, payout limits, accrued winning amounts before automatic payout, hopper limits, pay tables and pay rates, machine denomination, single winning event jackpot limits and game theme settings, peripherals present or disable/enable, tilt settings, machine volume levels, enable/disable of other communication protocols, such as accounting protocols, maximum bet, maximum win, player options, electronic fund options, and jackpot limits.

At an operation 116, the host machine activates the commination protocol and thereby performs translation and framing on the machine setting data request. Communication protocol translation and framing 116 comprises activation of a communication protocol, manipulation of the machine setting data request for transmission over a computer network in a format which may be interpreted, received and processed by a remote gaming machine and the providing of the processed machine setting data request to a network input/output device of the host machine. Thereafter at operation 120 the host machine performs input/output (I/O) operations on the machine setting data request, thereby transmitting it over the communication medium 104 to a gaming machine 108.

Upon receipt by the gaming machine 108, the machine setting data request is received in a similar I/O operation at operation 140. It is contemplated that the I/O operation 140 operate and execute in a manner similar to other communication over the network, thereby allowing the communication protocol described herein to interface and gain the advantages of existing network operations and apparatus. After the I/O operation at operation 140, the machine setting data request is forwarded to and activates an operation 144 wherein the communication protocol translation occurs at the gaming machine 108. Communication protocol translation interprets the machine setting data request and transforms the request into a format suitable for interpretation and processing by the gaming machine 108.

As it is contemplated that the communication protocol be compatible with various gaming machine platforms, operation 148 occurs to perform data variable translation on the variables that represent the machine settings in the machine setting data request. As is commonly understood, gaming machines often represent gaming machine settings with software variables that are used by the machine software during game play. It is contemplated that these variables may vary depending upon the gaming machine platform to which the machine setting data request was transmitted. Accordingly, operation 148 performs data variable translation to allow the gaming machine 108 obtain the proper information by translating one or more variables utilized by the host machine 100 to a variable set that is understood by the gaming machine 108. The translation process is described below in greater detail.

In an operation 152 the gaming machine 108 collects data for its current settings. It is contemplated that this step may occur in a manner previously performed by gaming machine 108 software as a result of the communication protocol translation operation 144 or the data variable translation of operation 148. After collecting the data regarding the current settings of the gaming machine 108, the gaming machine performs communication protocol translation and framing at operation 154 to facilitate transfer of the machine settings to the requestor or entity, in this case the host machine 104. After communication protocol translation and framing at operation 154 the machine settings are subject to an I/O operation 158. This occurs in a standardized method as would occur with other gaming machine data. Hence the communication protocol described herein is able to take advantage of existing network software routines and apparatus for input and output.

The I/O operation 158 transmits the current gaming machine settings over the communication medium 104 to a host machine 100. At the host machine 100 a similar I/O operation 124 occurs to receive the data from the gaming machine 108. The I/O operation 124 forwards the data to systems that perform operation 132. Operation 132 comprises communication protocol translation to translate data from the gaming machine out of the format of the standardized communication protocol to a format for use by the host machine 100. As can be understood, this operation may only be necessary in ceratin systems. In one embodiment the communication protocol for gaming machine configuration serves as an intermediate or background communication protocol to provide a standardized software interface for communication between the host machine and the one or more gaming machines 108 organized under software and hardware platforms.

At operation 136 the host machine 100 receives the machine setting data request response and may store the machine settings to a file or displaying the machine settings on a display or other user interface. It should be noted that the figure shown in FIG. 1 is a generalized procedure and other variations or procedures are contemplated which do not depart from the scope of the claims. Additional details of various embodiments are described below in greater detail.

Figure 2:
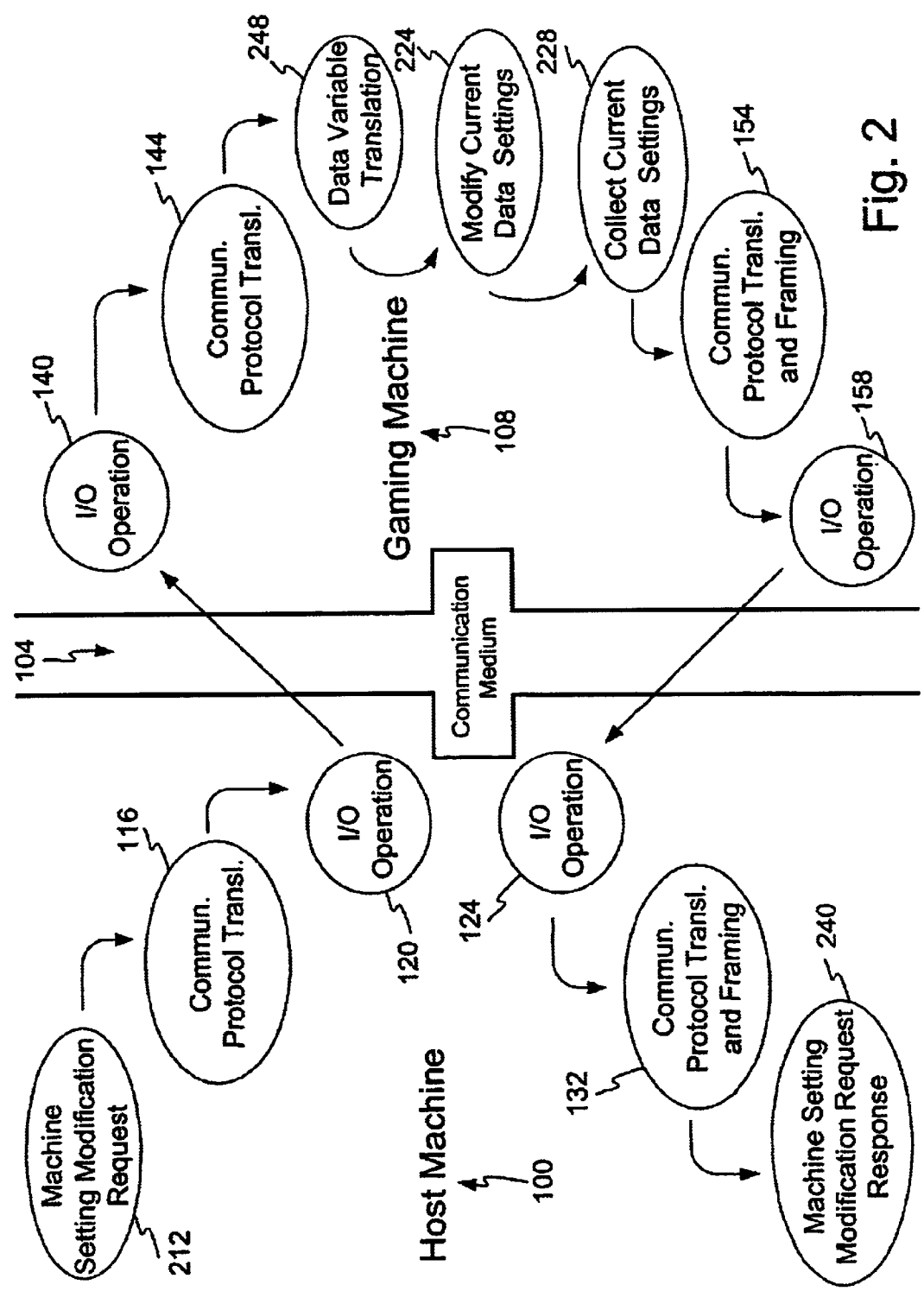
FIG. 2 illustrates a generalized process diagram of an example process for gaming machine setting modification.

FIG. 2 illustrates a generalized process diagram of an example process for gaming machine setting modification. As aspects of FIG. 2 are identical to aspects of FIG. 1, like elements are referenced with identical reference numbers. In contrast to FIG. 1, FIG. 2 generally describes the procedures used to modify machine settings using the communication protocol as described herein. The use of the communication protocol allows gaming machine settings to rapidly and efficiently modify gaming machine settings via a computerized network or other means of communication. In operation 212 it is contemplated that the communication protocol be compatible with various gaming machine platforms, operation 248 occurs to perform data variable translation on the variables that represent the machine settings in the machine setting data request. As is commonly understood, gaming machines often represent gaming machine settings with software variables that are used by the machine software during game play. It is contemplated that these variables may vary depending upon the gaming machine platform to which the machine setting data request was transmitted. Accordingly, operation 248 performs data variable translation to allow the gaming machine 108 obtain the proper information by translating one or more variables utilized by the host machine 100 to a variable set that is understood by the gaming machine 108. The translation process is described below in greater detail.

In an operation 224 the gaming machine 108 modifies its current settings based on the modification request. After modifying the data regarding the current settings of the gaming machine 108, the gaming machine performs communication protocol translation and framing at operation 228 to facilitate transfer a confirmation of the modification of the machine settings to the requestor or entity, in this case the host machine 104. After communication protocol translation and framing at operation 154 the machine settings are subject to an I/O operation 158. This occurs in a standardized method as would occur with other gaming machine data. Hence the communication protocol described herein is able to take advantage of existing network software routines and apparatus for input and output.

The I/O operation 158 transmits the current gaming machine settings over the communication medium 104 to a host machine 100. At the host machine 100 a similar I/O operation 124 occurs to receive the data from the gaming machine 108. The I/O operation 124 forwards the data to systems that perform operation 132. Operation 132 comprises communication protocol translation to translate data from the gaming machine out of the format of the standardized communication protocol to a format for use by the host machine 100. As can be understood, this operation may only be necessary in certain systems. In one embodiment the communication protocol for gaming machine configuration serves as an intermediate or background communication protocol to provide a standardized software interface for communication between the host machine and the one or more gaming machines 108 organized under software and hardware platforms.

At operation 240 the host machine 100 receives the machine setting modification request response and may store and/or display the confirmation of the new machine settings or store the new settings to a file. It should be noted that the figure shown in FIG. 1 is a generalized procedure and other variations or procedures are contemplated which do not depart from the scope of the claims. Additional details of various embodiments are described below in greater detail.

Figure 3A:
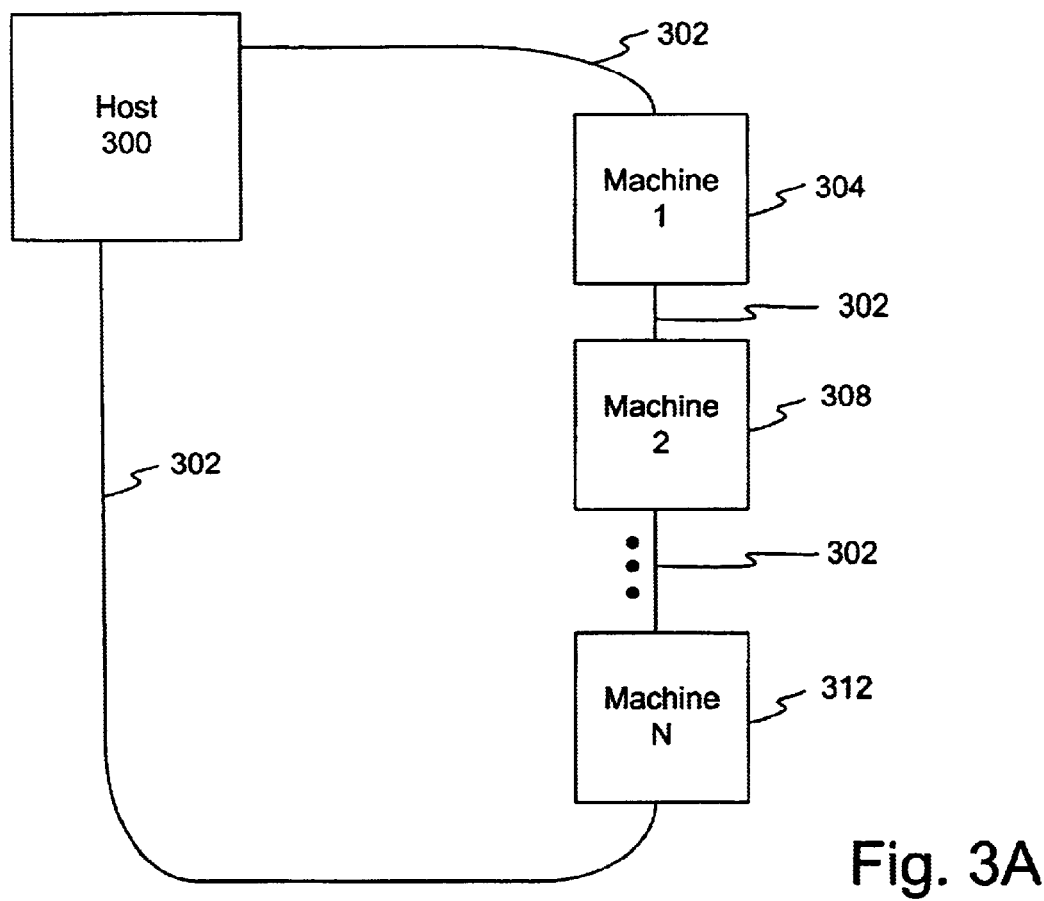
FIG. 3 illustrates a block diagram of an example embodiment of an exemplary computer network as may be used to facilitate machine setting status inquiries and machine setting modification in a loop configuration.

FIG. 3A illustrates a block diagram of an example embodiment of an exemplary computer network as may be used to facilitate machine setting status inquiries and machine setting modification using a communication protocol as described herein. The network configuration of FIG. 3A is configured in a daisy chain or loop format. The network includes a host computer 300 linked by one or more communication or network cabling 302 to gaming machines 304, 308 and 312. It is contemplated that N number of gaming machines may be configured in this matter up through gaming machine 312 designated a gaming machine N. In operation host machine 300 generates a message having a message address and transmits it over line 302. The message from the host 300 progresses along the network and is analyzed by each gaming machine 304, 308 and 312. Each gaming machine 304, 308 and 312 analyzes the message address to determine if it should accept and process the message from the host 300. Messages may be addressed to more than one or a range of gaming machines 304, 308 and 312. Any message format may be used and the message may be of any length transmitted as a single message or segmented into smaller messages according to a network protocol.

Figure 3B:
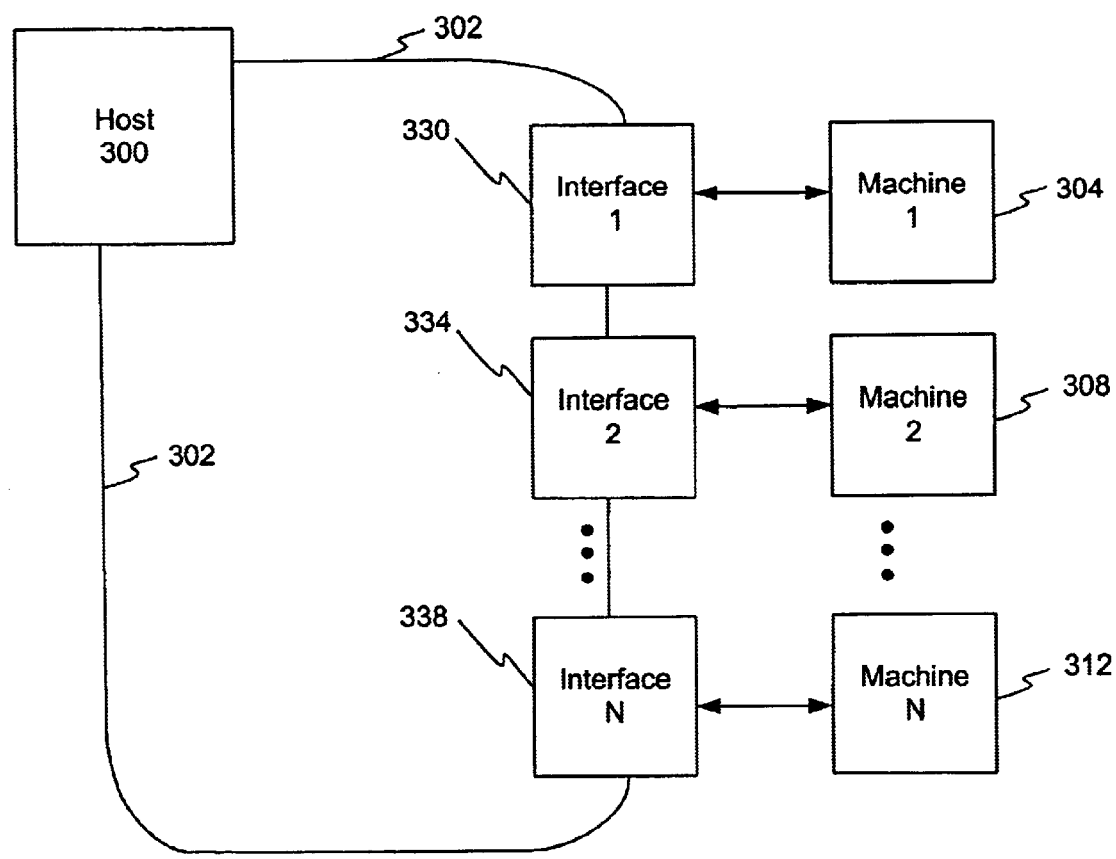

FIG. 3B illustrates a block diagram of an alternative embodiment to the configuration shown in FIG. 3A. Similar elements are labeled with identical reference numbers. Only the aspect of FIG. 3B which differ from FIG. 3A are discussed. As shown a first interface 330 connects to the host 300. The first interface 330 connects in series to a second interface 334. The second interface 334 may optionally connect to additional interfaces up to an Nth interface 338.

Each interfaces 330, 334, 338 connects to a gaming machine 304, 308, 312 as shown. In one embodiment the interfaces 330, 334, 338 perform communication services for the gaming machines 304, 308, 312. In one embodiment the interfaces 330, 334, 338 comprise network interface cards configured to receive, translate, or store data for a gaming machine. Other communication protocol services may be performed by the interfaces 330, 334, 338 such as variable translation or machine settings inquiries. In one embodiment the interface comprises a sub-host configured to perform at least partially as the 300.

Figure 4:
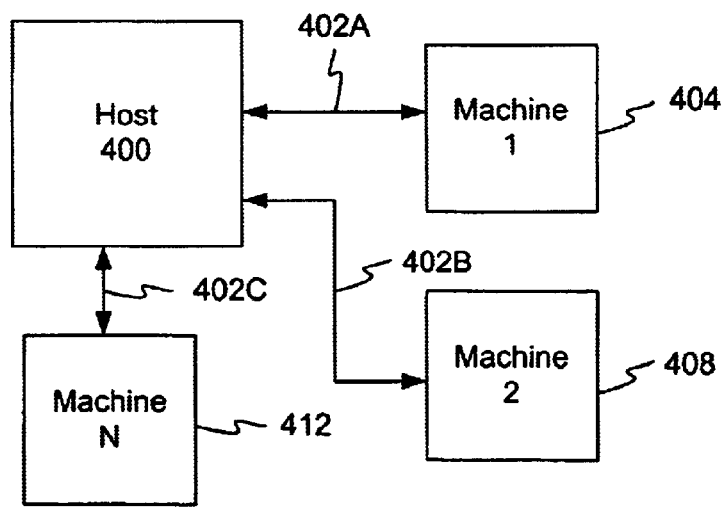
FIG. 4 illustrates a block diagram of an example embodiment of a computerized network configured in a star configuration.

FIG. 4 illustrates a block diagram of an example embodiment of a computerized network configured in a star configuration. The star network configuration show in FIG. 4 is a host computer 400 connected via several network links 402A, 402B, 402C. The network links 402 connect the host 400 to gaming machines 404, 408 and 412. Any number of gaming machines may be connected to the host 400 up to and as shown by Nth gaming machine 412. It is contemplated that each gaming machine can utilize a separate port (not shown) on the host 400.

In this configuration the host machine 400 generates a message such as a machine settings request or a machine setting modification request and forwards it to the particular machine 404, 408 and 412, based on the port address of the machine. A message may be provided to multiple ports or a range of ports on the host machine 400 to facilitate multiple machine addressing.

Figure 5:
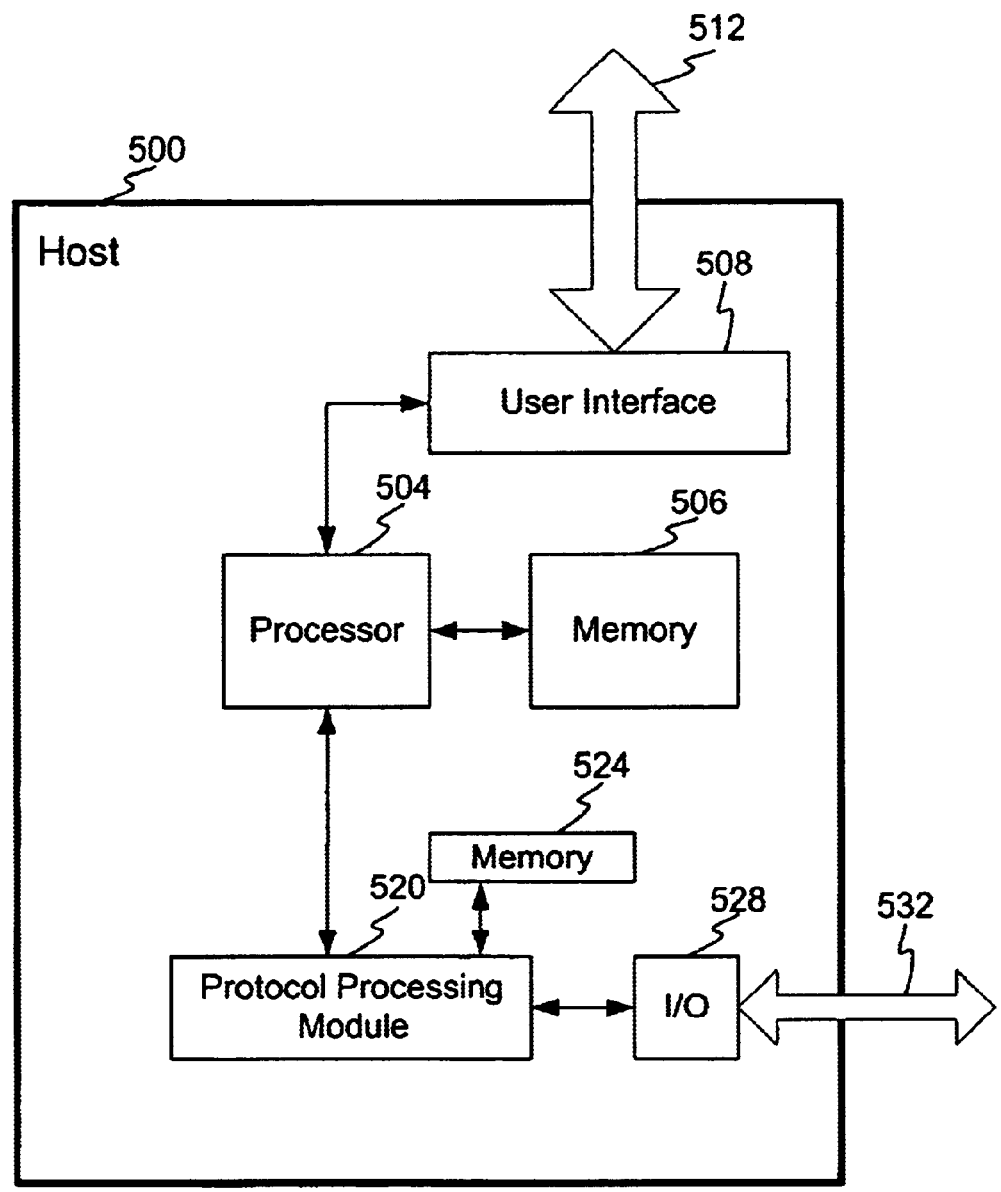
FIG. 5 illustrates a block diagram of an exemplary embodiment of a host computer.

FIG. 5 illustrates a block diagram of an exemplary embodiment of a host computer 500. This is but one exemplary embodiment and it is contemplated that one or ordinary skill in the art may design other embodiments. The host 500 includes a processor 504 in communication with a memory 506. The host 500 also includes a user interface 508 connected to the processor 504. The user interface 508 may include one or more input/output systems configured to use one or more input/output buses 512. The one or more input/output buses 512 facilitate interaction with a human operator or other computer systems.

As described herein a protocol processing module 520 communicates with a memory 524 and an input/output system 528. The I/O system 528 connects to one or more other computers via a computer network which may utilizes an input/output bus or communication channels 532.

The processor 504 may comprise any type processor or control logic configured to execute software code and oversee operation of a host machine 500. Examples of the processor 504 include, but are not limited to, a processor or CPU such as an Intel type or AMD type processor, an ASIC type processor, control logic, digital signal processor, or any other devices capable of executing software code or computer program code logic or interfacing with a computer network. Memory 506, which is in communication with processor 504, may comprise any type of memory including volatile or nonvolatile memory such as, but not limited to, a hard disk drive, magnetic memory, or flash memory, RAM, either static or dynamic, ROM, or optical memory. The memory 506 may be located internal to the host 500 or external such as on a RAID hard drive system or other external storage medium. The user interface 508 and bus 512 may comprise video display drivers and input/output hardware, keyboard, mouse or other input device, software, drivers and hardware or any other user interface system as may be contemplated by one of ordinary skill in the art.

A protocol processing module 520 comprises a configuration of hardware or software or both configured to perform processing on the data requests from the processor 504 into a standardized format for transmission over a computer network to be received by one or more gaming machines. In one embodiment the protocol processing module 520 is integrated within the processor 504. In one embodiment the protocol processing module comprises a one or more processors, an ASIC, control logic or other processing system. The protocol processing module may be incorporated into the processor 504. The memory 524 may comprise any type of memory. In one embodiment the memory comprises RAM. The protocol processing module 520 may further include variable translation tables, which may be integrated with the protocol processing module 520 or stored in memory 524. The variable translation table contains data to translate a machine setting variable defined by the processor 504 to a variable as would be understood by the gaming machine platform which eventually receives the machine setting inquiry or request. Hence a first variable may be translated to a second variable. It is further contemplated that a first variable may be expanded into more than one alternate variables. Thus, a single variable sent by a host may be translated into two or more variable that are understood by or used by the gaming machine. The first variable may be expanded into N number of variables where N is any positive integer. It is also contemplated that two or more variable sent by the host may be translated into a reduced number of variables or a single variable at the gaming machine. In addition the protocol processing module 520 in conjunction the I/O system 528 may formulate the communication protocol communications into packets for transmission over a computer network and perform transmission over a network line 532. The I/O system 528 may be referred to a network interface.

Figures 6, 8:
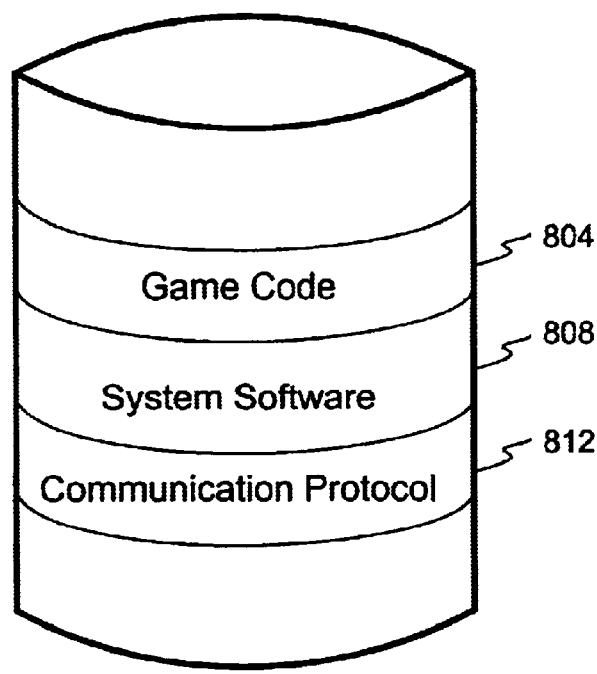
FIG. 6 illustrates an exemplary translation table.
FIG. 8 illustrates an example compilation of software code or computer program code logic retained on a storage medium.

FIG. 6 illustrates an example embodiment of a translation table 600. Although various different types of translation tables may be implemented for use with the communication protocol described herein, the table shown in FIG. 6 includes a communication protocol variable set, in column 1 604, which in this embodiment is recognized for use in a host computer. It is contemplated that the communication protocol variable shown in column 604 is defined by or understood by the host machine and the communication protocol. Hence these are the variables that would be used by the communication protocol software or a software system or module utilized by a user to request gaming machine status or request a change in gaming machine settings.

A second column 608 contains a variable set that corresponds to a gaming machine of a first type. A second column 612 contains a variable set corresponding to a gaming machine of a second type. A fourth column 616 contains variable set corresponding to a gaming machine of a fourth type. By way of example, a row 620 contains the communication protocol variable representing the pay limit for a gaming machine. In an exemplary communication protocol, the variable the represents the pay out limit is PAYLIMIT as shown in row 620. Gaming machines and the software executing thereon may not recognize the variable PAYLIMIT as the variable that represents the pay out limit. Utilizing the translation table and the type of gaming machine to which the data request or modification request is being sent, the translation table provides a variable set translation. Based on the information in the second column 608 the variable set for the type one gaming machine or type one platform is defined as a variable PYLIM. Likewise for second column this pay limit variable comprises the variable A while the variable for a third type gaming machine as shown in the fourth column as defined by the variable R. The remaining rows of the translation table illustrate other variables and their potential translation. These variables and their translations are provided by way of example and for purposes of understanding and discussion the present invention is not limited to these variables. Furthermore, any number of rows, columns or translations tables may be utilized as is necessary to achieve the method and apparatus described herein.

Figure 7:
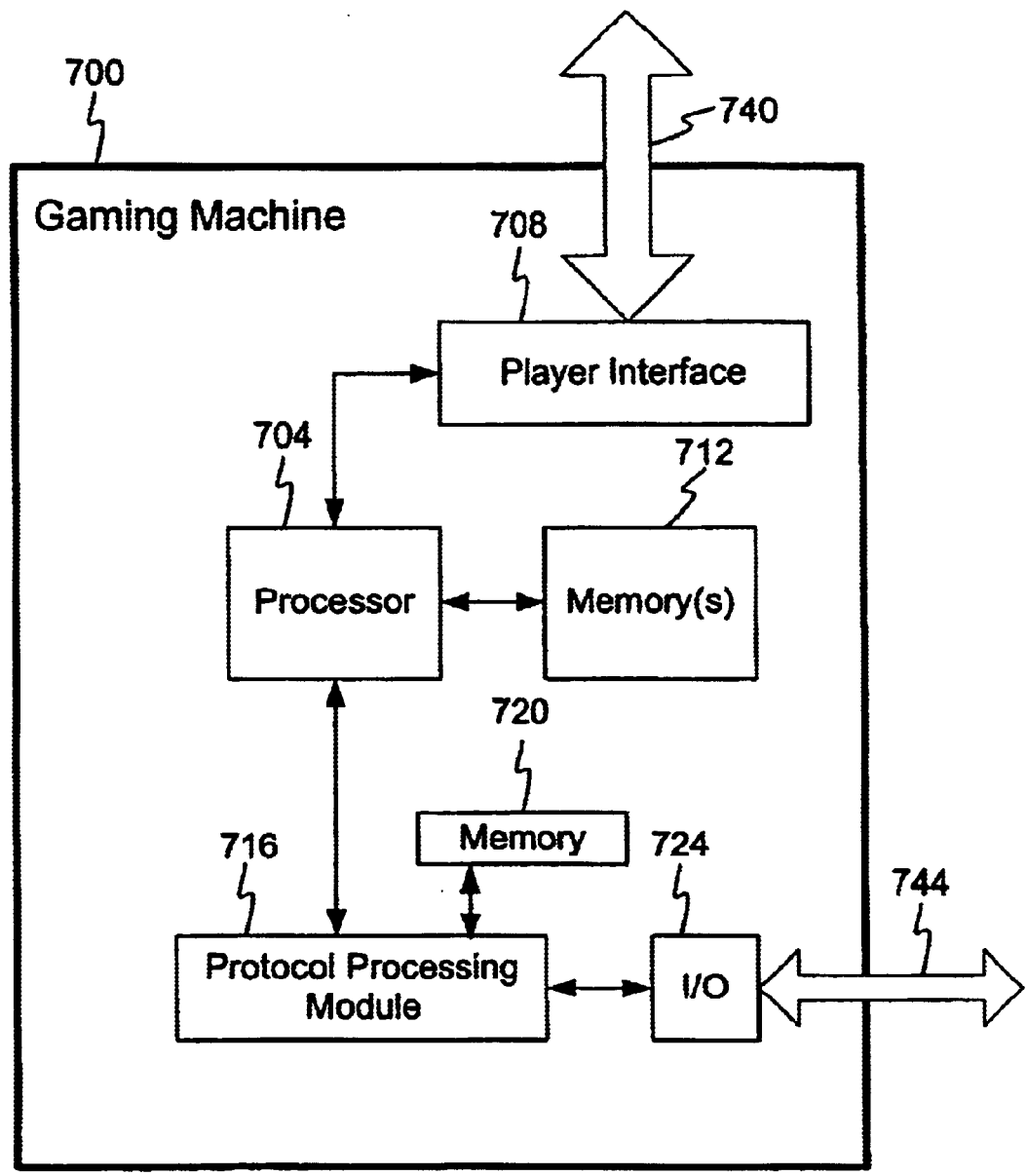
FIG. 7 illustrates a block diagram of an example embodiment of a gaming machine configured to utilize a communication protocol.

Turning now to FIG. 7, a block diagram of an example embodiment of a gaming machine configured to utilize the communication protocol and methods derived therefrom.

This is but one exemplary embodiment and it is contemplated that other configuration may be arrived at without departing from the scope of the invention. As shown a gaming machine 700 includes a processor 704 in communication with a memory 712. The gaming machine 700 also includes a user interface 708 connected to the processor 704. The user interface 708 may include one or more input/output systems configured to use an input/output bus 740. The one or more input/output buses 740 facilitate interaction with a human operator or other computer systems.

As described herein a protocol processing module 716 communicates with a memory 720 and an input/output system 724. The I/O system 724 connects to one or more other computers or other gaming machines via a computer network which may utilizes input/output bus or communication channels 744.

The processor 704 may comprise any type processor or control logic configured to execute software code and oversee operation of a gaming machine 700. Examples of the processor 704 include, but are not limited to, a processor such as an Intel type or AMD type processor, an ASIC type processor, control logic, digital signal processor, or any other devices capable of forcing a computer network. The memory 712, which is in communication with processor 704, may comprise any type of memory including volatile or nonvolatile memory such as, but not limited to, a hard disk drive, magnetic memory, or optical memory. The memory 712 may be located internal to the gaming machine 700 or external such as on a RAID hard drive system or other external storage medium. The user interface 708 and input/output lines 740 may comprise a video display drivers and input/output hardware, keyboard, mouse or other input device, software, drivers and hardware or any other user interface system as may be contemplated by one of ordinary skill in the art.

The protocol processing module 716 comprises a configuration of hardware or software or both configured to perform processing on the inquiries or modification requests from the processor 504 to thereby transform them into a standardized format for transmission over a computer network and for receipt by one or more gaming machines. In one embodiment the protocol processing module 716 is integrated within the processor 704. In one embodiment the protocol processing module comprises a one or more processors, ASIC, control logic or other processing system. The memory 720 may comprise any type memory. In one embodiment the memory comprises RAM. The protocol processing module 716 may further include variable translation tables, which may be integrated with the protocol processing module 716 or stored in memory 720. Either of the host machine or gaming machine or both may contain the translation tables and functionality associated therewith. The variable translation table translates a machine setting variable requested by the host to a variable as would be understood by the gaming machine platform which eventually receives the machine setting request. The protocol processing module 716 in conjunction the I/O system 724 perform input/output processing such as formulation of the request into a packet format for transmission over a network.

FIG. 8 illustrates an example compilation of software code such as may be stored on a gaming machine, such at in the one or more memories of the gaming machine shown in FIG. 7. It contemplated that the gaming machine may contain game code 804, system software 808 and communication protocols 812. The game code 804, system software 808 and communication protocols 812 may stored on any type of memory, storage medium, or processor readable medium.

The game code 804 comprises software configured to provide a game play to a player on the gaming machine. The system software 808 controls operation of the gaming machine, gaming machine peripherals, and use of a computer network to communicate with a host. The system software may also interfaces the game code 804 and the gaming machine. As a subsystem of the system software 804 the communication protocol 812 may comprise one or more software modules for use by this system software. Upon receiving a game setting data request or a request to modify current game settings the system software may activate the communication protocols 812 or utilize the communication protocols to respond to the requests from the host machine. In one embodiment is contemplated communication protocol 812 remain inactive in the background of the system software until receipt of a inquiry or modification request. Then the communication protocol interprets the request for settings modification and performs variable translation as necessary. It is further contemplated that software may be stored on the gaming system other than that shown in FIG. 8. This software facilitates operation of the gaming machine and facilitates communication over a computer network.

Figure 9A:
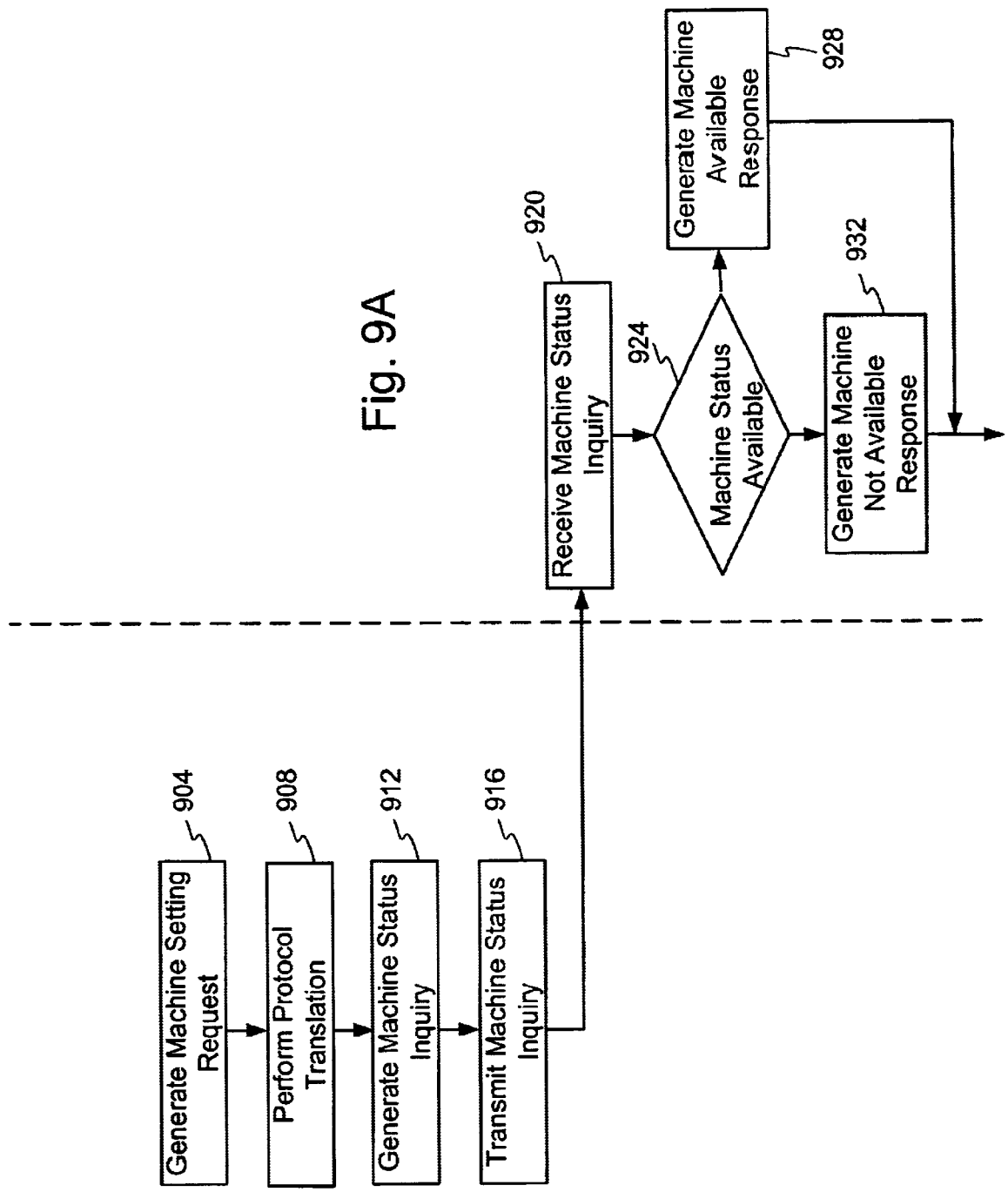
FIG. 9 illustrates an operational flow diagram of an example method of operation of the communication protocol performing a machine setting inquiry.

FIG. 9 illustrates an operational flow diagram of an example method of operation of the communication protocol. The method of operation shown in FIG. 9 is representative of communication between the host machine and one or more gaming machines wherein the host machine is requesting to the current status or configuration of the gaming machine's settings. FIG. 9 also illustrates the interaction between the host machine and the gaming machine in an exemplary method of operation. The steps shown or occurring on the left hand side of FIG. 9 represent activity occurring at the host machine while steps occurring or shown on the right hand side of FIG. 9 represent those at a gaming machine. Communication between the host machine and gaming machine may occur over a computer network or other communication system. It is further contemplated that a method of operation other than exactly shown in FIG. 9 may occur.

At step 904 the host machine generates a gaming machine setting request. The setting request may be generated as part of a scheduled and standard machine operation or through a specific user request generated especially for determining the settings of a game machine. In one embodiment a software interface is provided for users to efficiently and easily use the machine settings request operation. User interfaces may be provided to selectively specify which machine are subject to the machine setting request. Machines are usually identified by a network address or some other type of machine classification. Any addressing scheme may be adopted for use.

After the machine settings request is generated by the host machine the communication protocol performs protocol translation. This occurs at a step 908. Protocol translation comprises activation of the communication protocol and conversion of the machine setting request to the format and that is compatible for transmission over a computer network and/or receipt and processing by a gaming machine. Protocol translation may also include data variable conversion and a machine setting conversion in the host machine. However in the example embodiment of FIG. 9 the communication protocol module of the gaming machine stores the variable translation tables.

At a step 912 the host machine generates a machine status inquiry. A machine status inquiry comprises a request, to the gaming machine being polled, for its status. A settings request may be distinguished from a status inquiry in that the setting request is a request to determine the current settings of a gaming machine while a status inquiry is a inquiry to determine if the gaming machine is available to process a request, such as a settings request or a modification request. In one embodiment status comprises available and/or unavailable. Another embodiment status may be designated as active or inactive. An available or inactive machine is a machine that is not currently in play by a player while an unavailable or active machine comprises a gaming currently in play. As can be understood it is undesirable to poll machine settings of a game currently in play as this could interrupt game play or risk, although unlikely, a potential malfunction. Accordingly it is desired to collect data regarding gaming machine setting when the gaming machine is not in play. It is contemplated however, that the machine poll operation or the machine configure operation may occur during game play or during a period of game inactivity.

Thereafter at a step 916 the host machine transmits the machine status inquiry over the network to one of our gaming machines. It is contemplated that adequate network protocols, network addressing and packetizing and framing be incorporated into this step to achieve transmission over a computer network to the one or more gaming machines.

Turning now to the operation of the gaming machine at step 920, the gaming machine receives the machine status inquiry and performs analysis as would be understood one or ordinary skill in the art. The present goal is to determine whether the machine is available to respond to a machine status inquiry from a host. At a step 924 a determination is made regarding the machine status. If the machine status is available then the operation advances to step 928 and the gaming machine generates a machine available response for transmission to the host machine. Conversely, if at step 924 the game machine is not available then the gaming machine generates a machine not available response for transmission to the host. It is contemplated that the communication protocol may poll the gaming machine or the software located thereon to determine if the gaming machine is available. Although not shown it is further contemplated that an error code may be generated if a decisive response cannot be provided regarding machine availability.

Figure 9B:
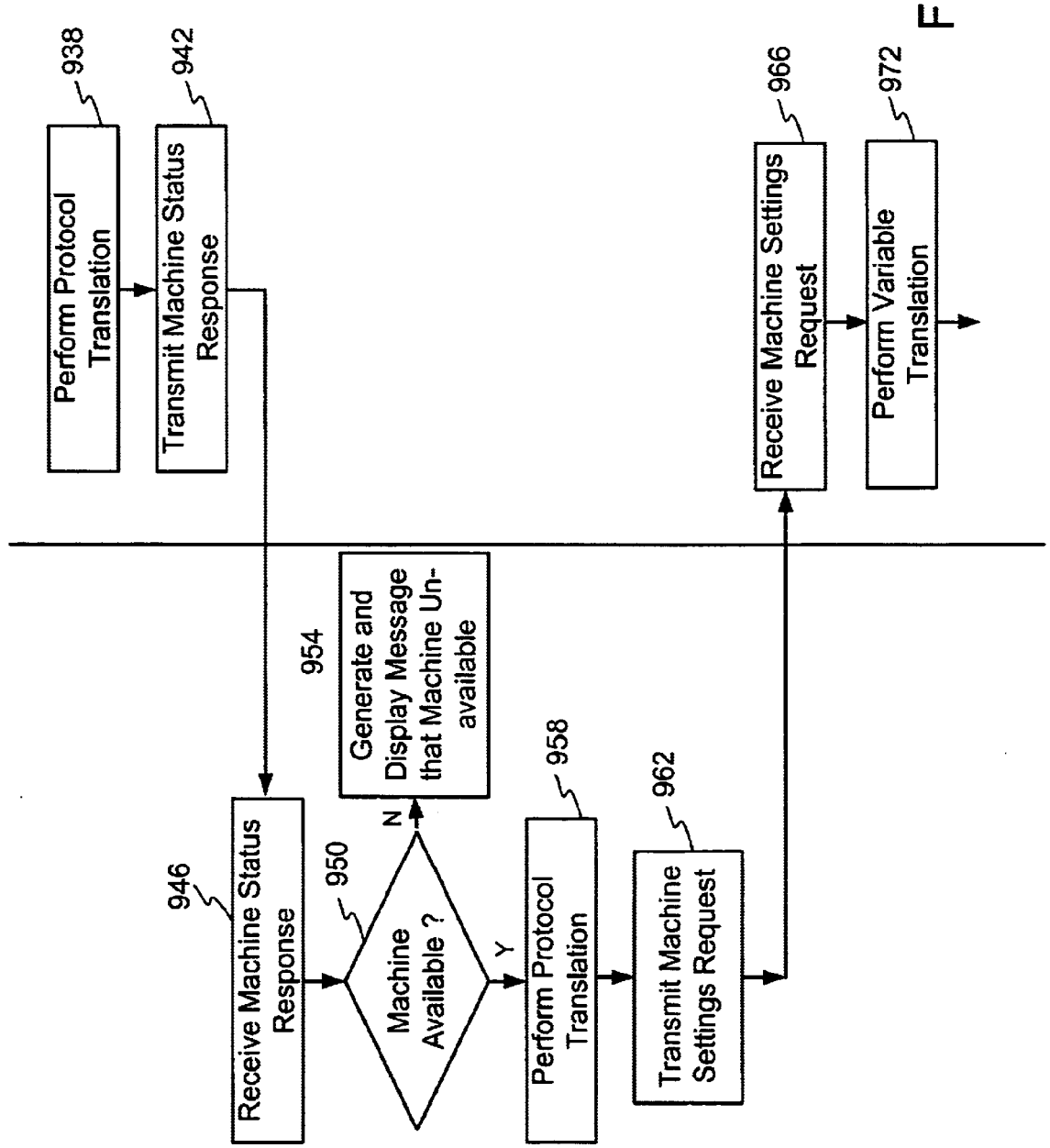

Turning now to FIG. 9B, the operation advances to step 938 wherein the communication protocol of the gaming machine performs protocol translation on the response so the response may be transmitted using the communication protocol. The operations of Step 934 may comprise translations from the communication protocol format to a format or message configuration compatible with the gaming machine or network interface. At a step 942 the gaming machine transmits the machine status response over the computer network to the host. This may occur in a manner know in the art such as in a manner compatible with existing or future gaming machine networks or computer networks.

After translation in a step 942 the host receives the machine status response from the gaming machine. This occurs at step 946. Thereafter the host may optionally perform communication protocol translation. At step 950 the host machine interprets whether the gaming machine is available based on a response from the gaming machine. If the gaming machine is unavailable the operation advances up to step 954 and the host machine may generate and display or store in memory a message that the gaming machine status is unavailable and hence no machine settings were retrieved.

In contrast, if at that Step 950 the gaming machine message is interpreted to indicate that the gaming machine is available then the operation advances to the step 958 and protocol translation may occur. Advancing to step 958 occurs if the machine is available to receive and process a machine settings inquiry. At a step 962 the host machine transmits the machine settings request over the computer network to one or more gaming machines.

Advancing to step 966 the gaming machine receives the machine settings request or inquiry and thereafter at step 972 performs variable translation on the machine settings request. In one embodiment the variable translation translates the variables used and understood by the communication protocol to a set of variables that represent the machine setting variables as used by the gaming machine. It is contemplated that the gaming machine may operate under any number of standards or platforms with various different operating systems. Hence the variable translation occurs to insure that the variable or information identified by the host machine may be properly matched up with or correlated to the variables and data as understood by the gaming machine. As a result, the communication protocol described herein may be compatible across different gaming machine platforms or operating systems. The translation table such as that show in FIG. 6 may be utilized to this end.

Shown on FIG. 9C the gaming machine operating software polls the machine settings based on the translated variables. This occurs at a step 974. This occurs in a manner dependant upon the gaming machine platform and operation system of the gaming machine. Thereafter at a step 976 the gaming machine, after having obtained the gaming machine settings from the various apparatus and software of the gaming machine, performs protocol translation on the data to facilitate transmission of the gaming machine setting over the computer. It is further contemplated that this may include compiling the gaming machine settings into a response or performing a re-translation of the gaming machine data back to the original variables so that the requested data may be understood by the host machine and the communication protocol located on the host machine. Packetizing, addressing, and the like may also be performed at step 976. Thereafter at a step 980 the gaming machine transmits the machine setting response.

After transmission the operation advances to a step 984 wherein the host machine receives the machine settings response and provides the receives data to the communication protocol. At step 988 the communication protocol performs protocol translation on the data to translate it into a format for use by the host machine. It is contemplated that a software module be running on the host machine for storage of the data or display of the data to the requesting party. Accordingly at a step 992 the host machine records or displays the machine settings. Although not expressly described in FIG. 9 is contemplated that the gaming machine being polled may optionally be placed into an inactive status so as to not interfere with game play. It should be noted however that the polling process is of sufficiently short time duration that a machine reporting an inactive status would likely not enter into active game play before the polling operation is completed.

FIG. 10 illustrates an example of an operational flow diagram of an example method of operation of a gaming machine setting modification routine. This is one example method of a operation routine to change a machine setting using the communication protocol described herein. As compared to FIG. 9, FIG. 10 contains similar steps. For purposes of understanding and readability, the entire processes of machine setting modification is described.

The method of operation shown in FIG. 10 is representative of communication between the host machine and one or more gaming machines wherein the host machine is requesting that the settings of gaming machine be modified. The steps shown or occurring on the left hand side of FIG. 10 represent activity occurring at the host machine while steps occurring or shown on the right hand side of FIG. 10 represent those at a gaming machine. Communication between the host machine and gaming machine may occur over a computer network or other communication system. It is further contemplated that a method of operation other than exactly shown in FIG. 10 may occur.

At step 904 the host machine generates a gaming machine setting modification request. The modification request may be generated as part of a scheduled and standard machine operation or through a specific user request generated especially for determining the settings of a game machine. In one embodiment a software interface is provided for users to efficiently and easily modify the settings. User interfaces may be provided to selectively specify which machine are subject to the machine setting modification request. Machines are usually identified by a network address or some other type of machine classification. Any addressing scheme may be adopted for use.

After the machine setting modification request is generated by the host machine the communication protocol performs protocol translation. This occurs at a step 1008. Protocol translation comprises activation of the communication protocol and conversion of the machine setting request to the format and that is compatible for transmission over a computer network and/or receipt and processing by a gaming machine. Protocol translation may also include data variable conversion and a machine setting conversion in the host machine. However in the example embodiment of FIG. 10 the communication protocol module of the gaming machine stores the variable translation tables.

At a step 1012 the host machine generates a machine status inquiry. A machine status inquiry comprises a request, to the gaming machine being polled, for its status. In one embodiment status comprises available and/or unavailable. Another embodiment status may be designated as active or inactive. An available or inactive machine is a machine that is not currently in play by a player while an unavailable or active machine comprises a gaming currently in play. As can be understood it is undesirable to modify machine settings of a gaming machine that is currently in play as this could interrupt game play or risk, although unlikely, a potential malfunction. Accordingly it is desired to modify data regarding gaming machine settings when the gaming machine is not in play.

Thereafter at a step 1016 the host machine transmits the machine status inquiry over the network to one of our gaming machines. It is contemplated that adequate network protocols, network addressing and packetizing and framing be incorporated into this step to achieve transmission over a computer network to the one or more gaming machines.

Turning now to the operation of the gaming machine at step 1020, the gaming machine receives the machine status inquiry and performs analysis as would be understood one or ordinary skill in the art. The present goal is to determine whether the machine is available to respond to a machine setting modification request from a host. At a step 1024 a determination is made regarding the machine status. If the machine status is available then the operation advances to step 1028 and the gaming machine generates a machine available response for transmission to the host machine. Conversely, if at step 1024 the game machine is not available then the gaming machine generates a machine not available response for transmission to the host. It is contemplated that the communication protocol may poll the gaming machine or the software located thereon to determine if the gaming machine is available. Although not shown it is further contemplated that an error code may be generated if a decisive response cannot be provided regarding machine availability.

Figure 10B:
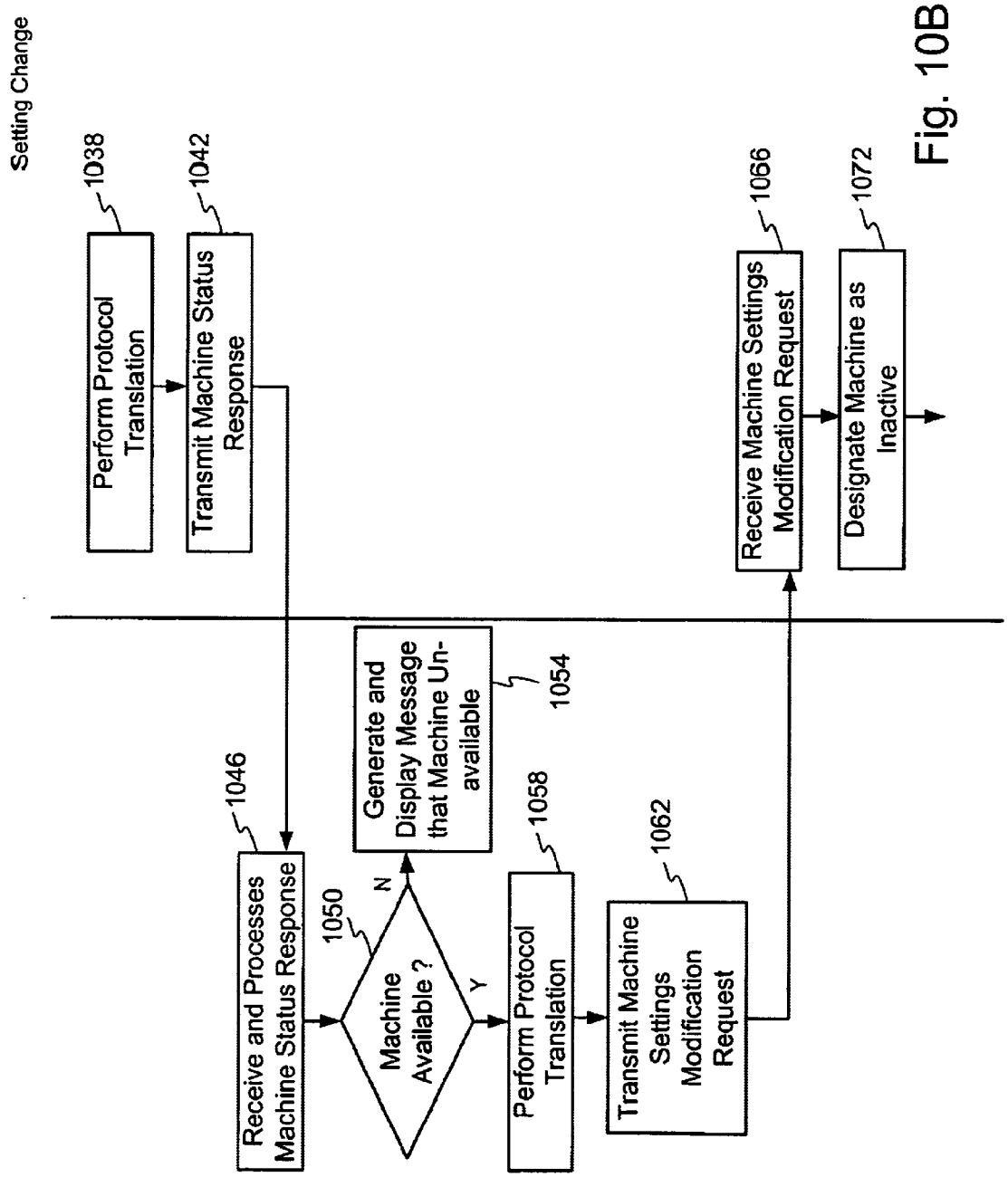
FIG. 10 illustrates an operational flow diagram of an example method of operation of the communication protocol performing a machine setting change request.

Turning now to FIG. 10B, the operation advances to step 1038 wherein the communication protocol of the gaming machine performs protocol translation on the response so the response may be transmitted using the communication protocol. The operations of step 1034 may comprise translations from the communication protocol format to a format or message configuration compatible with the gaming machine or network interface. At a step 1042 the gaming machine transmits the machine status response over the computer network to the host. This may occur in a manner know in the art such as in a manner compatible with existing or future gaming machine networks or computer networks.

After translation in a step 1042 the host receives the machine status response from the gaming machine. This occurs at step 1046. Thereafter the host may optionally perform communication protocol translation. At step 950 the host machine interprets whether the gaming machine is available based on a response from the gaming machine. If the gaming machine is unavailable the operation advances up to step 1054 and the host machine may generate and display or store in memory a message that the gaming machine status is unavailable and hence no machine settings were retrieved.

In contrast, if at that Step 1050 the gaming machine message is interpreted to indicate that the gaming machine is available then the operation advances to the step 1058 and protocol translation may occur. Protocol translation of step 1058 may occur before or after a determination is made regarding whether the machine is available. At a step 1062 the host machine transmits the machine settings modification request over the computer network to one or more gaming machines.

Advancing to step 1066 the gaming machine receives the machine settings modification request and thereafter, at step 1072, designates the machine as inactive. Designating the gaming machine as inactive prevents the gaming machine from entering into play during the settings modification process. The modification process is anticipated to be brief and hence the short period of inactive status will not significantly lower a gaming machines profit potential.

As shown on FIG. 10C, and at step 1074, the operation performs variable translation on the machine settings modification request. In one embodiment the variable translation translates the variables used and understood by the communication protocol to a set of variables that represent the machine setting variables as used by the gaming machine. It is contemplated that the gaming machine may operate under any number of standards or platforms with various different operating systems. Hence the variable translation occurs to insure that the variable or information identified by the host machine may be properly matched up with or correlated to the variables and data as understood by the gaming machine. As a result, the communication protocol described herein may be compatible across different gaming machine platforms or operating systems. The translation table such as that show in FIG. 6 may be utilized to this end.

Next, the gaming machine, based on the received modification request, modifies the settings of the gaming machine at step 1076. The modification may occur in a manner dictated by the gaming machine and as may be known in the art. Thereafter, at step 1078, the gaming machine, communication protocol, or other software executing on the gaming machine polls the machine settings based on the translated variables. This occurs in a manner dependant upon the gaming machine platform and operation system of the gaming machine. At a step 1080, the gaming machine, after having obtained the gaming machine settings from the various apparatus and software of the gaming machine, performs protocol translation on the data to facilitate transmission of the gaming machine setting over the computer. It is further contemplated that this may include compiling the gaming machine settings into a response or performing a re-translation of the gaming machine data back to the original variables so that the requested data may be understood by the host machine and the communication protocol located on the host machine. In one embodiment the response of step 1078 serves as a confirmation to the host machine that the settings were modified in the manner requested. Packetization, addressing, and the like may also be performed at step 1076. Thereafter at a step 1082 the gaming machine transmits the machine setting response to the host or any other system, device, or entity that requested the gaming machine setting modification.

After transmission the operation advances to a step 1094 and 1084. At step 1094 the gaming machine is restored to active status to game play or operation may occur using the modified settings. At step 1084 the host machine receives the machine settings modification response and provides the receives data to the communication protocol. At step 1086 the communication protocol performs protocol translation on the data to translate it into a format for use by the host machine. It is contemplated that a software module be running on the host machine for storage of the data or display of the data to the requesting party. Accordingly at a step 1092 the host machine records or displays the machine settings. Although not expressly described in FIG. 10 is contemplated that the gaming machine having its settings modified need not be placed into inactive status.

In is further contemplated that in one embodiment a gaming machine may serve as a host for purposes of configuring other gaming machines. Thus it is contemplated that the communication protocol and the associated software to facilitate configuring other gaming machines may be located on a gaming machine. In such an embodiment a technician may access a gaming machine to thereby configure other gaming machines. Such an embodiment may be desired in gaming machine networks that lack a host or when a host configuration process is unavailable or undesirable. The gaming machine configured to configure other gaming machine using the protocol described herein may include software to facilitate interface by a technician.

In operation a technician may configure a first gaming machine in any manner possible. Thereafter, the technician may activate the communication protocol described herein to configure gaming machines other than the first gaming machine in the manner described herein. A configuration identical to or different from the first gaming machine may be selected for other gaming machines. It is further contemplated that adjacent gaming machines, gaming machines in a gaming machine bank or any other gaming machine may be configured. Configuring from a gaming machine provides the same benefits over the prior art described above by providing a more rapid and efficient means to configure gaming machines. The advantages are available after setting up a first gaming machine in a known manner and in a location wherein other gaming machines to be configured may be readily identified.

In one embodiment the configuration occurs using a device other than a gaming machine or a host. It is contemplated that configuration may occur from a laptop computer, personal digital assistant, handheld computing device, or any other wireless or hardwired communication or computing device. In such an embodiment, a technician may connect to the one or more gaming machines to be configured and perform processing in the manner described above to facilitate a configuration change or query. Either a wireless, optical, or hardwired connection may occur. It is further contemplated that such a device may have pre-stored thereon the desired gaming machine settings or connect to a gaming machine or other source to obtain the desired machine settings. These machine settings would be stored in a memory located in the device for transfer to one or more other gaming machines. Machine updates may occur at different properties from common configuration file(s).

It will be understood that the above described arrangements of apparatus and the method therefrom are merely illustrative of applications of the principles of this invention and many other embodiments and modifications may be made without departing from the spirit and scope of the invention as defined in the claims.

We claim:

1. A method for determining settings on a gaming machine via a computerized network that is linked to a plurality of different gaming machines having different gaming machine platforms, the method comprising:

generating a machine settings request at a host, the machine settings request comprising a plurality of variable sets for the plurality of different gaming machine platforms with each variable set being associated with a different gaming machine platform and each variable set comprising a plurality of variables;

converting the settings request using a communication protocol to create a standardized settings request;

transmitting the standardized settings request over a computer network to a gaming machine;

receiving the standardized settings request at a gaming machine having a first platform;

performing a variable translation at the gaming machine on the standardized settings request that pertain to the first platform to obtain translated variables for said first platform;

retrieving machine settings including a variable set including a plurality of variables from the gaming machine based on the translated variables;

transmitting a response containing the machine settings comprising a plurality of variables to the host machine;

receiving a response from a gaming machine; and displaying or recording the response.

2. The method of claim 1, wherein the method further includes, upon receipt of the standardized settings request at the gaming machine, designating the gaming machine in inactive status.

3. The method of claim 1, further comprising verify the gaming machine is not in play prior to retrieving the machine settings at a gaming machine.

4. A method for determining the settings of a gaming machine via a computerized network comprising:

receiving a machine settings request at a gaming machine having a particular platform, the machine settings request comprising a plurality of variable sets for the plurality of different gaming machine platforms with each variable set being associated with a different gaming machine platform and each variable set comprising a plurality of variables;

converting the variable set of the machine settings request to a gaming machine specific format based on a communication protocol and a translation table to identify the variable set for the platform of said gaming machine;

polling the gaming machine to obtain the requested gaming machine settings; and transmitting the gaming machine settings over the computerized network.

5. The method of claim 4, furthering including transmitting a machine active message to a host machine if the gaming machine is in play upon receipt of the machine settings request and if gaming machine is in play then not polling or transmitting the gaming machine settings.

6. A method for modifying gaming machine settings from a host computer, the method comprising:
generating a machine status inquiry at the host computer;
sending the machine status inquiry to a gaming machine having a particular type of platform over a computer network;
receiving, at the host computer, an inquiry response from the gaming machine, the inquiry response indicating if the gaming machine is available;
sending a gaming machine setting modification request to the gaming machine if the inquiry response indicates that the gaming machine is available, the gaming machine setting modification request configured to modify a plurality settings of the gaming machine and wherein the gaming machine settings modification request comprising a plurality of variable sets for a plurality of different gaming machine platforms with each variable set being associated with one type of gaming machine platform and each variable set comprising a plurality of variables; and
converting the setting modification request to a format for use by the machine at the gaming machine by identifying the variable set that pertains to the platform of the gaming machine and modifying settings of the gaming machine based upon said variable set;
receiving, at the host computer, a gaming machine setting modification response comprising a plurality of variables from the gaming machine.

7. The method of claim 6, wherein generating comprises obtaining input from a user of the host computer regarding which of one or more gaming machines to send a status inquiry to and formatting the status inquiry into a format for transmission over a computerized network.

8. The method of claim 6, wherein the method is performed by a software module configured to communicate with the gaming machine over a computer network using a communication protocol.

9. A method for modifying settings of a gaming machine having a particular platform comprising:
providing data to a computerized device regarding which plurality of settings to modify;
formatting the data into a machine setting modification request for use by software on the gaming machine, the machine settings request comprising a plurality of variable sets for the plurality of different gaming machine platforms with each variable set being associated with a different gaming machine platform and each variable set comprising a plurality of variables;
providing the setting modification request to a network interface of the computerized device for transmission to a gaming machine;
receiving and processing the setting modification request at the gaming machine by identifying the variable set pertaining to the platform of the gaming machine;
seizing control of the gaming machine; and
modifying one or more settings of the gaming machine based on the setting modification request.

10. The method of claim 9, wherein the computerized device comprises a computer.

11. The method of claim 9, wherein transmission to a gaming machine occurs over a computerized network.

12. The method of claim 9, wherein providing data further includes providing data regarding which gaming machine is to have its settings modified.

13. The method of claim 9, wherein the method further includes translating at least one variable to a one or more alternate variables, wherein the one or more alternate variables are utilized by the gaming machine.

14. The method of claim 9, further including sending a setting modification confirmation from the gaming machine to the computerized device to provide confirmation that gaming machine settings were modified.

15. A system for changing one or more settings of a gaming machine from a remote location, the system comprising:
a host system comprising:
a user interface;
a first network interface configured to communicate over a computerized network;
a processor configured to execute computer program code logic;
a processor readable medium storing:
computer program code logic configured to generate a gaming machine settings modification request, the computer program code logic being configured to receive the gaming machine settings modification request via the second network interface and the computer program code logic being configured to process the gaming machine settings modification request are standardized to operate on more than one type of gaming machine platform with each game setting modification request comprising a plurality of variable sets comprising a plurality of variables with each variable set being associated with a different platform;
computer program code logic configured to receive the gaming machine settings modification request and transmit the gaming machine settings modification request to a gaming machine via the first network interface;
a gaming machine of a particular gaming machine platform comprising:
a second network interface configured to communicate over a computerized network;
a processor configured to execute computer program code logic; and a processor readable medium storing;
computer program code logic configured to receive the gaming machine settings modification request via the second network interface;
computer program code logic configured to process the gaming machine settings modification request to thereby modify a plurality settings of the gaming machine by identifying the variable set associated with the machine platform; and
the processor readable medium storing computer program code logic being configured to translate a variable representing a setting to be modified by the gaming machine settings modification request to a format compatible with the gaming machine.

16. The system of claim 15, wherein the gaming machine settings modification request is in a format compatible with two or more gaming machine network protocols.

17. The system of claim 15, wherein one of the one or more settings of the gaming machine comprises a setting that controls the pay out rate for the gaming machine.

18. The system of claim 15, wherein the gaming machine further includes a processor readable medium storing computer program code logic configured to prevent gaming machine play during modification of one or more settings of the gaming machine.

19. A communication protocol to facilitate the modification of one or more settings of a plurality of different types of gaming machines of different gaming machine platforms from a remote location, the communication protocol configured to:

receive data from a machine settings control module located on a host system, the data identifying at least one gaming machine out of the plurality of different types of gaming machines to which a settings request is to be sent;

process the data into a machine settings request, the settings request compatible with a plurality of different gaming machine platforms equipped with the communication protocol, the machine settings request comprising a plurality of variable sets for the plurality of different gaming machine platforms with each variable set being associated with a different gaming machine platform and each variable set comprising a plurality of variables;

provide the machine settings request to a communication device associated with the host system for transmission to a gaming machine at a remote location; and the protocol further being configured to translate the variable set associated with the communication protocol to a variable set associated with one of the plurality of different types of gaming machines.

20. The communication protocol of claim 19, further configured to:

receive the settings request from a communication device associated with the gaming machine;

process the settings request to determine one or more actions requested in the settings request; and execute the one or more actions.

21. The communication protocol of claim 20, further configured to prevent play of the gaming machine when the communication protocol processes the settings request and executes the one or more actions.

22. The communication protocol of claim 19, wherein the settings request comprises a request to determine current settings of a gaming machine.

23. The communication protocol of claim 19, wherein the gaming machine comprises a gaming machine on a casino floor.

24. The communication protocol of claim 19, wherein the communication device comprises a communication device configured to transmit the settings request over a computer network, the computer network consisting of a local area network, a wide area network, a gaming machine network, the Internet, a public switched telephone network, and a wireless network.

* * * * *

UNITED STATES PATENT AND TRADEMARK OFFICE
CERTIFICATE OF CORRECTION

PATENT NO. : 6,884,174 B2
DATED : April 26, 2005
INVENTOR(S) : Chris Lundy et al.

It is certified that error appears in the above-identified patent and that said Letters Patent is hereby corrected as shown below:

Column 18,
Line 65, after "The method of claim 4," please delete "furthering" and insert -- further -- in its place.

Signed and Sealed this

Nineteenth Day of July, 2005

JON W. DUDAS
*Director of the United States Patent and Trademark Office*